May 8, 1928. 1,668,889
W. CHALMERS
AIRCRAFT AND AIRPLANE CONSTRUCTION
Filed Feb. 13, 1926 5 Sheets-Sheet 1
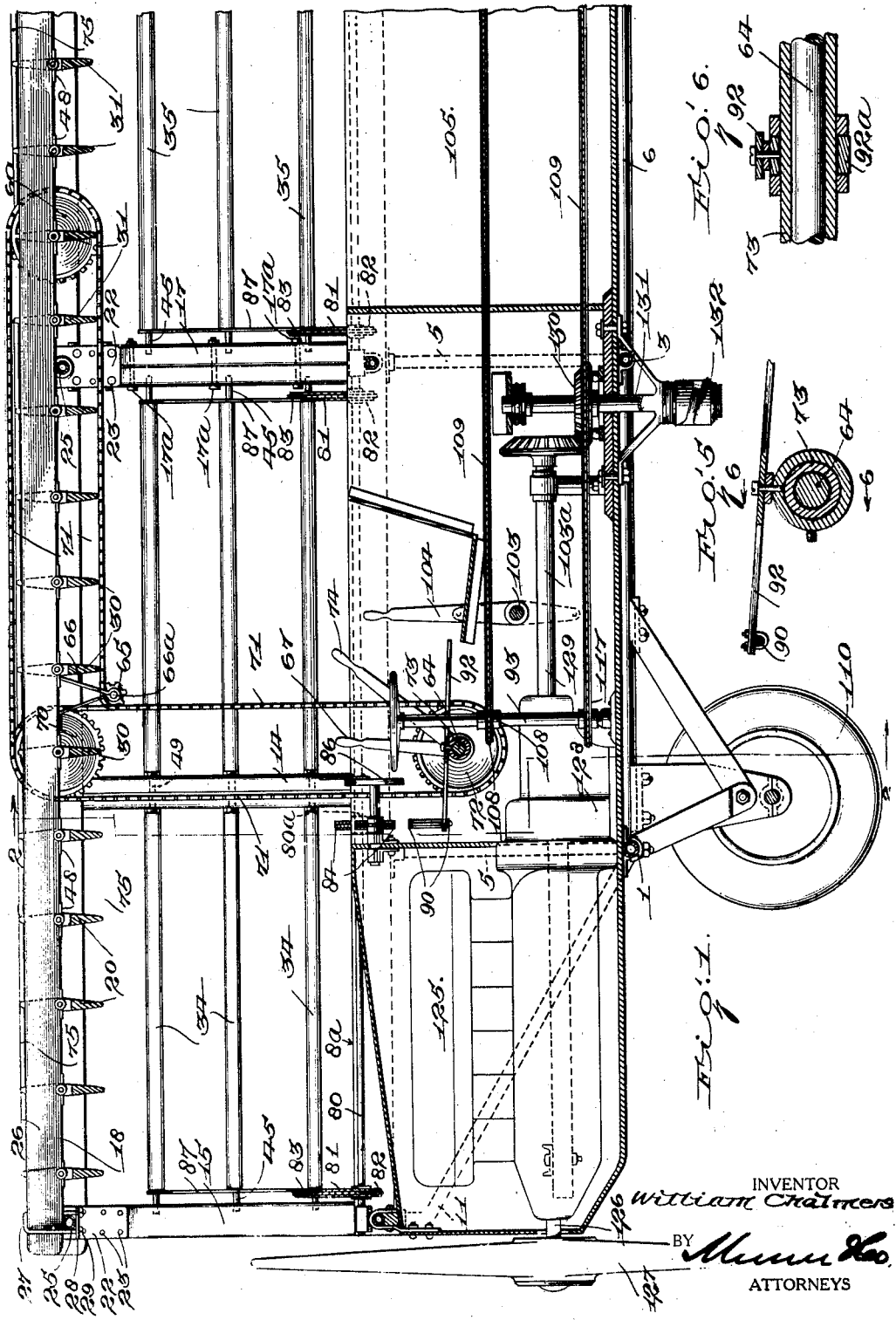
INVENTOR
William Chalmers
BY
ATTORNEYS

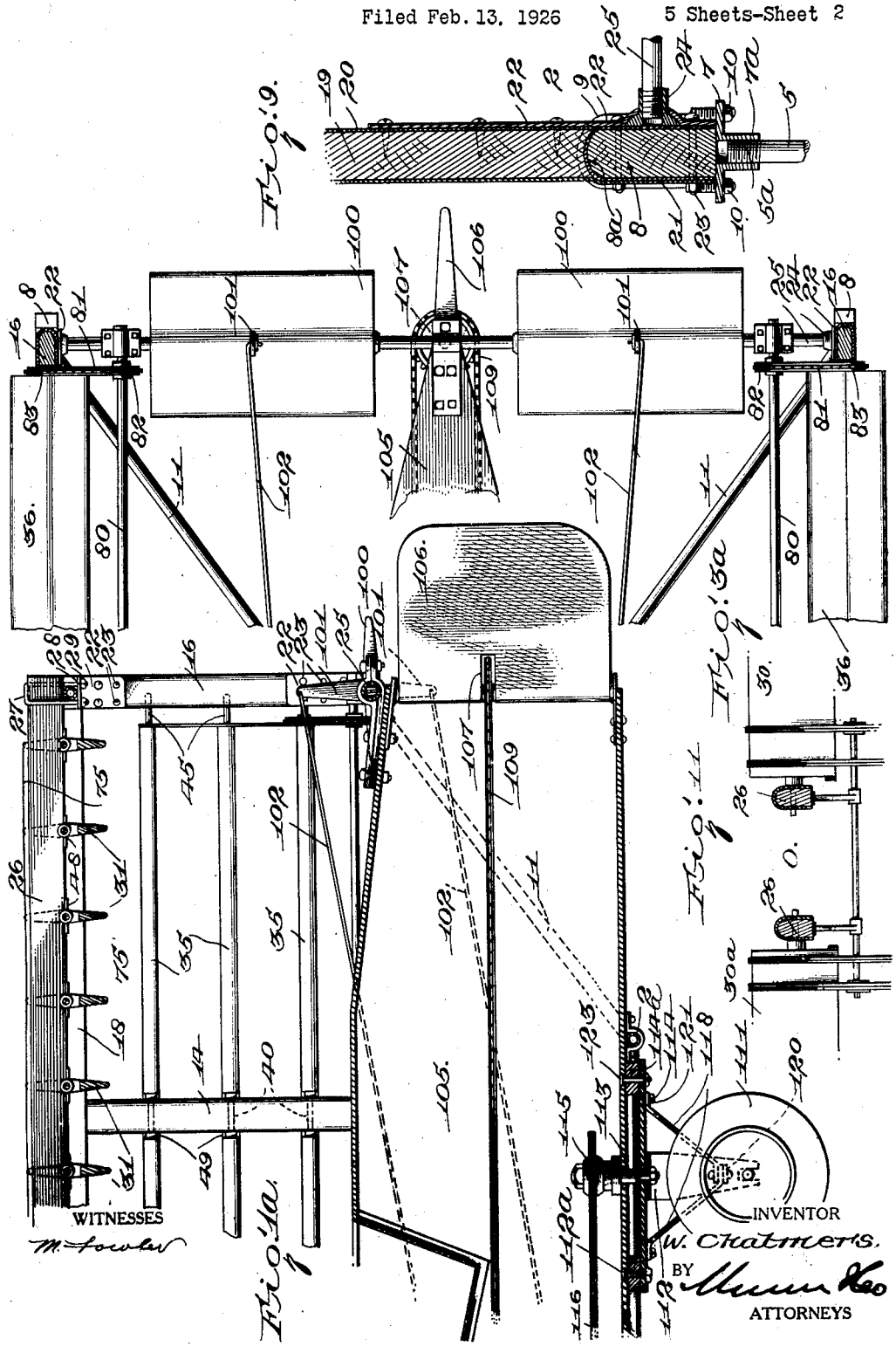

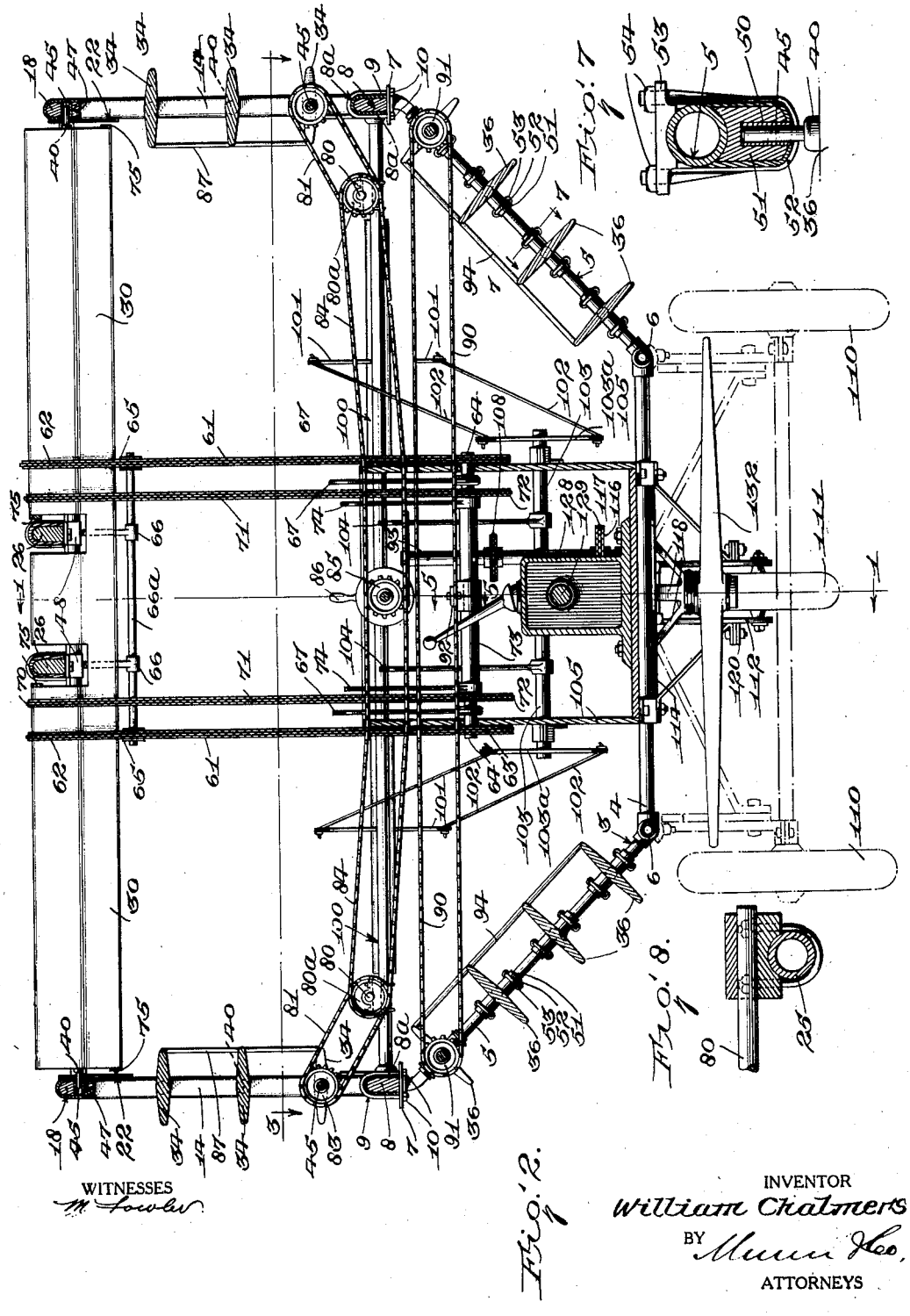

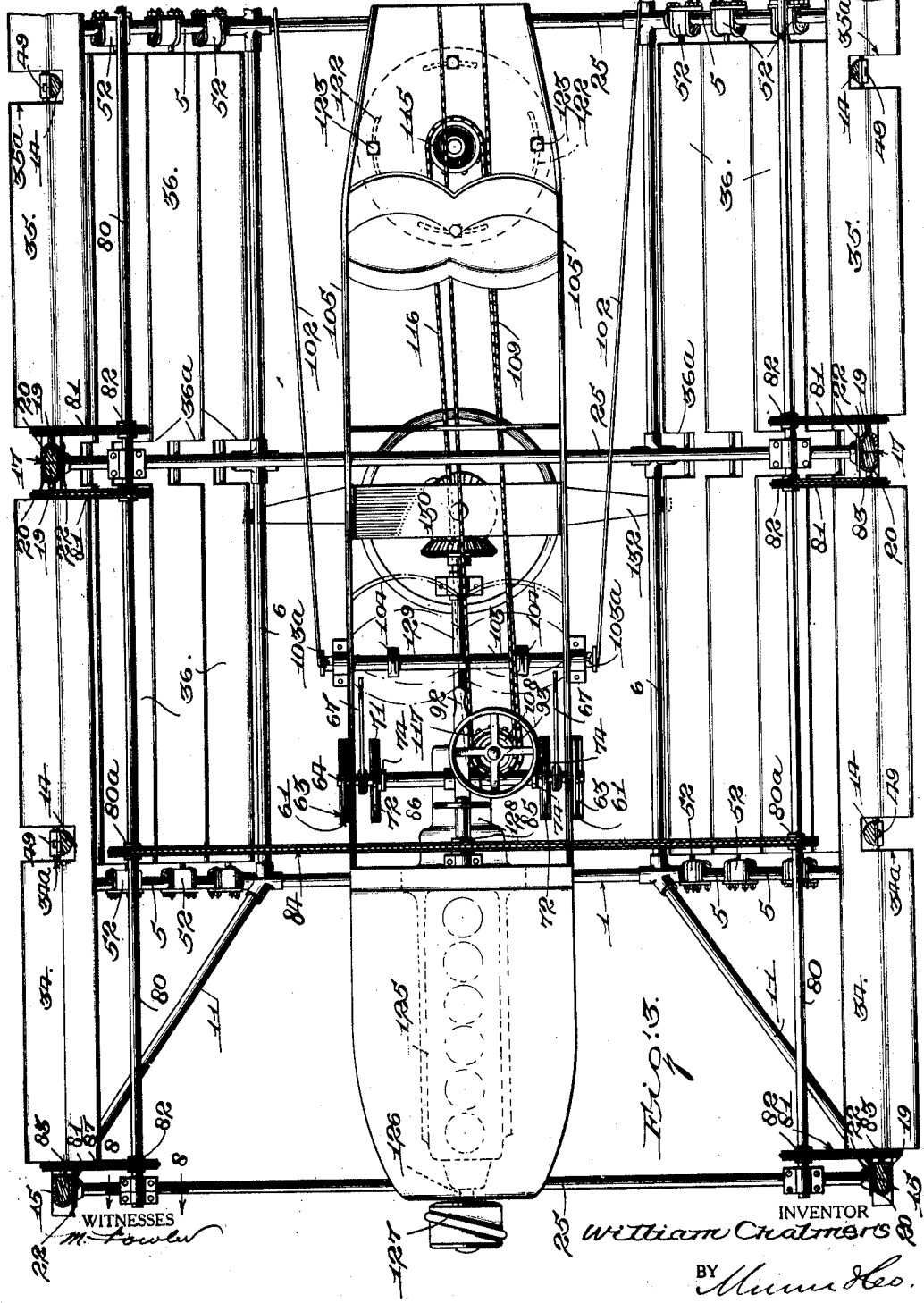

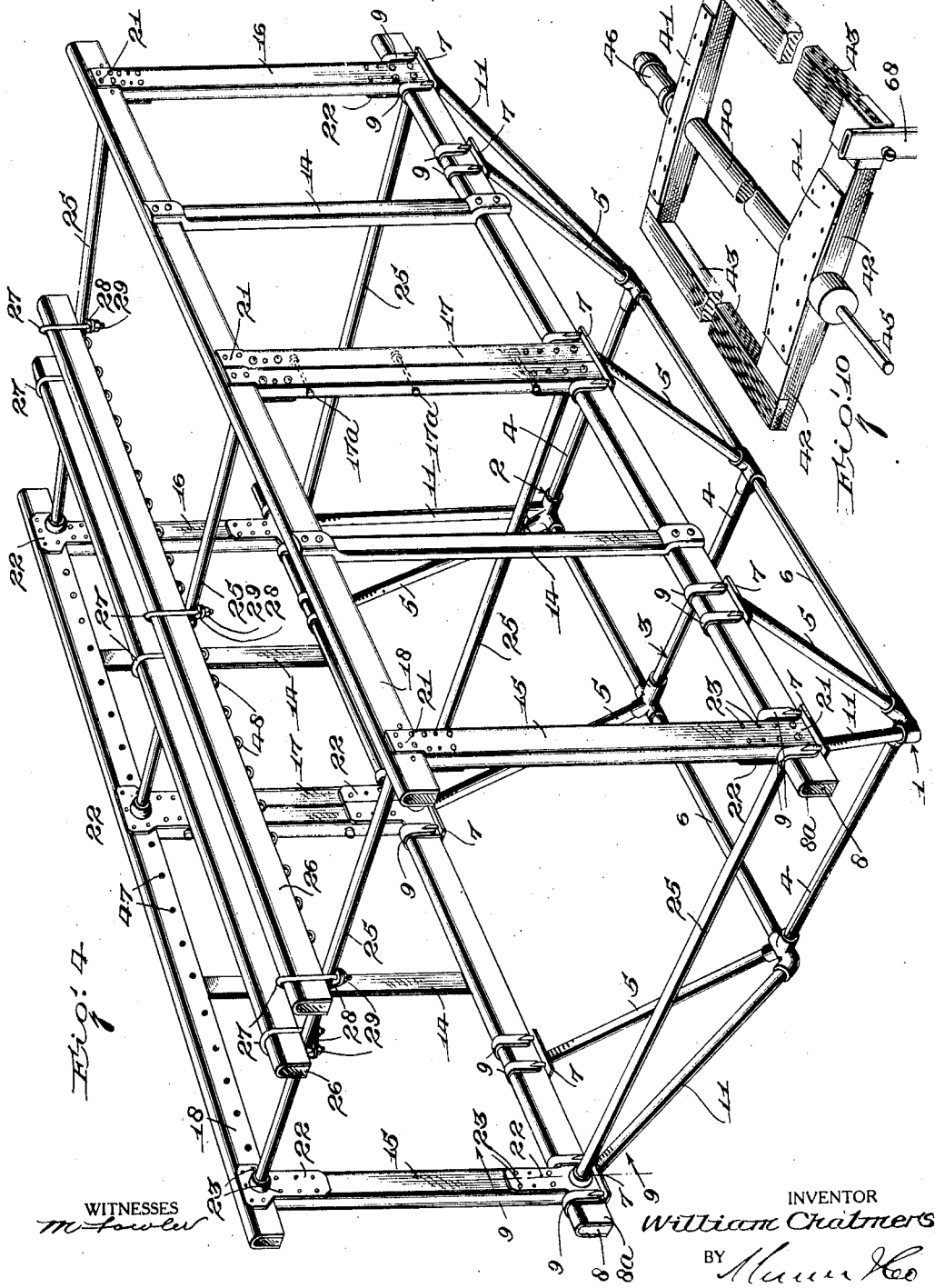

Patented May 8, 1928.

1,668,889

UNITED STATES PATENT OFFICE.

WILLIAM CHALMERS, OF SACRAMENTO, CALIFORNIA.

AIRCRAFT AND AIRPLANE CONSTRUCTION.

Application filed February 13, 1926. Serial No. 88,073.

This invention relates in general to flying machines of the heavier than air type and more particularly to an air craft which combines the qualities of an air aeroplane and a helicopter.

The object of the invention resides in the provision of an air craft of this character which is of compact and symmetrical form to the ends of convenience in storage and balance in flight, which is of great carrying power and high maneuvering ability, and which is capable of developing a high speed in flight and also capable of approximate hovering over any desired point.

A further object is, by suitable disposition of planar surface in and with relation to the slipstream to secure a greater degree of support therefrom and also a steadying effect by control of the lateral escape of slipstream air in flight.

A still further object is the provision of a novel form of variable sustaining surface capable of shedding snow.

Another object is to provide an air craft of this character which is capable of near approach to a vertical take-off and of safe and easy landing on small areas.

Other objects and advantages reside in certain novel features of the construction, arrangement and combination of parts which will be hereinafter more fully described and particularly pointed out in the appended claim, reference being had to the accompanying drawings forming a part of this specification, and in which:

Figure 1 is a fragmentary view in longitudinal vertical section taken on the line 1—1 of Figure 2 and showing the major portion of the air craft embodying the present invention, Figure 1a is a fragmentary view similar to Figure 1 but showing the extreme rear end of the air craft shown in Figure 1, Figure 2 is a view in transverse vertical section taken on line 2—2 of Figure 1, Figure 3 is a view in horizontal section on line 3—3 of Figure 2;

Figure 3a is a fragmentary view similar to Figure 3 but showing the extreme rear end of the air craft, Figure 4 is a detail perspective view of the framing employed, the struts and braces being omitted, Figure 5 is a detail sectional view on line 5—5 of Figure 2, Figure 6 is a similar view on line 6—6 of Figure 5, Figure 7 is a sectional view on line 7—7 of Figure 2, Figure 8 is a sectional view on line 8—8 of Figure 3, Figure 9 is a sectional view on line 9—9 of Fig. 4, Figure 10 is a fragmentary detailed view in perspective illustrating the internal vane structure, and Figure 11 is a fragmentary view, partly in elevation and partly in section, showing how the vanes are mounted on top rails 26 to provide an open or military type of ceiling.

Referring to the drawings wherein for the sake of illustration is shown an embodiment of the invention, it will be seen that a suitable frame is provided. One type of frame which may be employed is shown to advantage in Figure 4 and is made up of end frame members designated generally at 1 and 2, and an intermediate frame member designated generally at 3. The frame members 1, 2 and 3 are of identical construction and each frame member is approximately U-shaped and comprises a body portion 4 and diverging legs 5. The frame members may be constructed of metal piping or of tubular elements of any suitable material, and the body portions and legs of the frame members are coupled in any suitable way. Longitudinal side bars 6 are suitably coupled to the frame members at the juncture of the legs and body portions thereof. As shown in Figure 9 an attaching plate 7 is suitably fastened to the upper end of each leg 5. Preferably this fastening of each leg 5 and its plate 7 is brought about by externally threading the vertical upper end of each leg 5 as at 5a and engaging such threaded end with an internally threaded socket 7a formed on and depending from its attaching plate 7. Side rails 8 rest on the attaching plates 7 of the legs 5 on each side of the frame and these side rails are secured to the attaching plates on which they rest by means of U-bolts or clips 9 and nuts 10. The side rails 8 are preferably of wood and are provided with a light weight sheet metal casing 8a. The ends of the side rails project beyond the end frame members 5 and these projecting ends are braced or supported by means of the inclined braced members 11, the brace members 11 being secured at their lower ends to the frame members. Attaching plates 7 are also provided at the upper ends of the brace members 11 and are also secured to the side rails by means of U-bolts or clips 9 and nuts 10.

Front end posts 15, rear end posts 16, and doubled center or intermediate posts 17 are supported upon the side rails 8 and upstanding vertically therefrom. The sections of each double post 17 are secured together by suitable releasable fastening devices 17$^a$. Top rails 18 are provided above each side rail 8 and are carried by the posts 15, 16 and 17. Vertical braces 14 are also provided between the side and top rails. Each of the posts 15 and 16, each of the elements of each double post and each of the top rails 18 consists of a piece of wood 19 with one round edge and encased on three sides in a metal sheathing 20 secured to the wood by rivets or suitable fastening devices. The portion of the metal sheathing which is located on the outside of each post is extended at its ends beyond the posts as indicated at 21 to overlap the adjacent top or side rails as the case may be and to aid in securing the posts and rails to each other. Attaching plates 22 are provided at the juncture of the posts and side and top rails and each attaching plate is arranged on the inside of the frame and is secured by suitable fastening devices 23 to both the posts and rails. The fastening devices 23 which co-act with the side and top rails and plates 22 also extend through the extensions 21. As shown in Figure 9, the plates 22 retain internally threaded sockets 24 and the sockets 24 of oppositely disposed plates 22 are threadedly engaged with the externally threaded ends of transverse brace bars 25. As shown in the drawings the brace bars 25 extend between the side rails and the top rails above and below opposed posts. A pair of intermediate top rails 26 are carried by the upper transverse brace bars 25 and are fastened thereto in fixed parallel relation as by means of the bolts or clips 27, plates 28 and nuts 29. Like the posts 15, 16 and 17 and top rails 18 the intermediate top rails 26 are made up of pieces of wood and metal sheathing. However, tubular metallic elements may be used if desirable.

On the top and sides of the frame thus constituted, a number of vanes are mounted as will be hereinafter more fully described and these vanes provide the sustaining or reactive surface of the air craft and with other vanes also control the lateral escape of the slipstream to steady and stabilize the craft. The vanes provided on the top of the framing are arranged in two groups or series, there being a group or series 30 at the front of the machine and a group or series 31 at the rear of the machine (see Fig. 1). The vanes of the groups or series 30 and 31 are mounted on parallel axes extending transversely of the machine and disposed in a horizontal plane. The vanes arranged on the sides of the frame are also provided in groups or series, there being a forward group 34 and a rearward group 35 on each side of the machine. The forward series 34 at each side extends between and is assembled with the front corner post on its side and the front section of central post 17 and the rear series on each side extends between and is assembled with the rear corner post and the rear section of the central post. The vanes 34 and 35 are mounted on parallel axes extended longitudinally of the machine and located one above the other in a vertical plane. Intermediate their ends the vanes 34 and 35 are partially cut away, as at 34$^a$ and 35$^a$ to accommodate the braces 14 (see Fig. 3). In addition to the vanes 34 and 35 on each side of the machine, inclined series of vanes 36 are provided on the side of the machine and are carried by the diverging legs 5 of the frame members.

All of the vanes are of identical construction with the exception of the necessary modifications made in several of the vanes for the operating and idling sprockets and as shown in Figure 10 each includes a tubular shaft or axis 40. At spaced intervals upon the shaft or axis 40 pairs of metallic strips 41 are brazed, soldered, or welded, or otherwise suitably secured, the strips 41 having central portions secured to the shaft 40 and having their end portions projecting on the opposite sides thereof. Wooden ribs 42 are disposed between and secured to the end portion of the strips 41. Longitudinal strips 43 connect the outer edges of the wooden ribs 42 and are suitably secured to such outer edges. A light weight fabric or metallic covering extends around and encloses the vane framework thus constituted.

The top vanes 30 and 31 have pintles 45 at the ends of their shafts 40, the pintles 45 rotatably fitting in bearings 47 provided therefor in the top rails 18 and the shafts 46 rotatably fitting in bearings 48 provided therefor on the undersides of the intermediate top rails.

The side vanes 34 and 35 have pintles 45 at both ends of their shafts 40, the pintles 45 of the vanes 34 and 35 being rotatably fitted in suitable bearings provided therefor in the posts 15, 16 and 17. The portions of the shafts 40 of these vanes 34 and 35 which are comprehended within the cutaway portions 34$^a$ and 35$^a$ are rotatably fitted in bearings 49 provided therefor on the vertical braces 14 (see Fig. 3).

The vanes 36 also have pintles 45 (see Fig. 7) at the ends of their shafts 40 and these pintles 45 are rotatably fitted in bearings 50 provided therefor in blocks 51 secured by U-bolts or clips 52, plates 53 and nuts 54 to the legs 5 of the frame members 1 and 2. The vanes 36 also have cut-away portions 36ª (see Fig. 3) which accommodate the legs 5 of the intermediate frame member 3 which carries the bearings for shaft 40.

The vanes of all of the series are designed in the position parallel to each other to leave open spaces between the vanes or they are designed to be brought into edge to edge relation or into such position that the edges of the adjacent vanes slightly overlap each other. Of course, the vanes may also be moved to any position of intermediate parallel relation or edge to edge or overlapping relation. Any suitable means may be provided for moving and controlling vanes so that their positions may be varied.

While any suitable form of control may be used for the various vanes it is thought best to illustrate one form of control by way of example.

One vane of the series of vanes 31 (see Fig. 1) is provided with sprocket wheels 60 which are fixed to the axis or shaft of the vane on which they are mounted, said vane being cut away to accommodate the sprockets 60. Sprocket chains 61 are trained over the sprocket 60 and over idlers 62 (see Fig. 2) loosely mounted on the shafts or axes of vanes of the series 30. The sprocket chains 61 are also trained over control sprocket wheels 63 fixed on the ends of a control shaft 64. The sprocket chains 61 are also run over idlers 65 carried by shafts 66ª mounted on brackets 66. Levers 67 are fixed to the shaft 64 and serve as means for imparting movement to the shaft. It is to be understood that a quadrant and lever latch may be employed in conjunction with each lever 67 if desired and also in conjunction with the other levers hereinafter to be described. Connecting links 75 (see Fig. 1) are pivotally connected to all of the vanes of the series 31 and serve to constrain all of the vanes to corresponding movement so that a movement imparted to one vane of each of the series 31 and from the lever 67 is imparted to all of the vanes of both such series.

One vane of the series 30 has sprocket wheels 70 fixed thereto. Sprocket chains 71 are trained over sprocket wheels 70 and over controlled sprocket wheels 72 fixed to the ends of a sleeve control shaft 73 rotatably mounted on the shaft 64. Hand levers 74 are fixed to the sleeve 73 and provide means for controlling and moving the same. The vanes of the series 30 are also constrained to corresponding movement by virtue of the provision of links 75 pivotally connected to the vanes of such series.

The vanes of the series 30 and 31 provide the main sustaining surfaces of the air craft and may be adjusted to vary the degree and character of the sustaining action. The vanes are cut away to accommodate the top rails 26. Fig. 2 shows this feature in connection with the vanes 30.

The vanes of the series 34 and 35 are controlled from shafts 80 by means of sprocket chains 81 trained over sprocket wheels 82 fixed to the shafts 80 and over sprocket wheels 83 fixed to the ends of the shaft 40 of one of the vanes of each series. The shafts 80 are controlled by means of an endless sprocket chain 84 trained over sprockets 80ª fixed to the shafts 80 and actuated from a control sprocket 85 having a hand lever 86 fixed thereto. Links 87 are pivotally connected to the vanes of the series 34 and 35 for the purpose of constraining these vanes to corresponding movement.

The inclined series of vanes 26 are controlled from a sprocket chain 90 trained over sprocket wheels 91 fixed to a vane of each of the series 36 and is self-controlled from a tiller 92 pivotally mounted on a collar 92ª loosely fitted on the shaft 73 as shown in Figs. 5 and 6. Links 94 are provided and are pivotally connected to the vanes 36 to constrain them to corresponding movement.

The vanes 34, 35 and 36 may be adjusted to vary the sustaining effect to some extent and also to control the escape of the slipstream and provide means for lateral balancing.

Elevators 100 are rotatably mounted on the rear end cross bar 25 which connects the lower ends of the corner post. Cross arms 101 are connected with the elevators 100 and have control wires 102 connected to their ends and to arms 103ª of a control shaft 103 journaled on a suitable fuselage 105 mounted on the frame. The shaft 103 is controlled by levers 104.

A rudder 106 is pivotally mounted at the rear end of the fuselage and has a sprocket wheel 107 fixed to its axis and controlled from a steering column 93 by means of a sprocket wheel 108 and sprocket chain 109 trained over the sprocket wheels 108 and 107. It is to be understood that the control wires and sprocket chains described herein may be constituted by any suitable flexible elements and that these control wires and sprocket chains may be extended through guide tubes or conduits over guide sheaves, and also through or around the fuselage as found most convenient.

A running gear is provided and comprises a pair of front ground wheels 110 and a single rear steering wheel 111. The steering wheel 111 is rotatably mounted on a wheel frame 112 to which a king bolt 113 is fixed. The king bolt 113 is fixedly secured to a bearing plate 114 having limited rotary movement in a bearing ring 114ª and is controlled by means of a sprocket wheel 115 and a sprocket chain 116, the sprocket chain 116 being trained over the sprocket wheel 1

115 and over a sprocket wheel 117 fixed to the steering column 93. Brace members 118 are connected to the wheel frame, as at 120 and with the bearing plate 114, as at 121. The rotary movement of the bearing plate 114 and its ring 114ᵃ is limited by slots 122 and bolts and nuts 123 for which see Fig. 3.

The arrangement shown wherein there is provided a common control for the steering wheel of the landing gear or running gear and for the rudder is an important feature of the invention, for with this arrangement the steering wheel 111 supplements the action of the rudder in flight and the advantage of a single control for the steering wheel and rudder is had at all times.

An improved aeroplane engine 125 is provided and the forward end of this engine shaft 126 has a conventional propeller 127 fixed thereto, the propeller 127 rotating in a vertical plane and serving to pull the air craft along the line of flight. The engine 125 is also equipped with a clutch and selective transmission gear 128 which connects with the rear end of the engine shaft to actuate and drive the shaft 129 connected by bevelled gears 130 with a vertical shaft 131, to the lower end of which a horizontal propeller 132 is fixed. By an adjustment of the vanes of the series 30 and 31 and the joint operation of the horizontal and vertical propellers it is possible to obtain an approximately vertical take-off and slow speed or hovering flight and a safe landing on small areas.

The fuselage may be provided with seats, bulk heads and any of the other features ordinarily used and suitable to the present type of construction. The feature of constituting the major sustaining surface of adjacent vanes which may be moved to provide a continuous unbroken sustaining surface is one of the principal features of the invention; for an inclined setting of the vanes in conjunction with the provision of the horizontal propeller as well as the vertical propeller enables almost vertical ascent to be had. Provision of the side vanes and of the inclined vanes enhances the maneuvering capacity of the air craft and also aids its stability, since it enables the air craft to avail itself of the forces of the slipstream heretofore unused. The provision of the adjustable vanes of the sustaining surface and on the sides also enables the air craft to shed snow and hail that might otherwise accumulate thereon. This same feature admits clear and unobstructed view and the possibility of directing gun fire through the top of the plane as well as through the side and bottom thereof. It is also to be noted that the main sustaining surface of the air craft has its greatest dimension in the line of flight and this is believed to be a feature lending to safety, stability and economy of construction.

As shown in Figure 11 instead of having the vanes extend entirely across the machine the vanes may be provided in groups at each side of the machine, as indicated at 30ᵃ and 30ᵇ in Fig. 11, the vanes in this event being pivotally mounted on the top rails 26, as shown in Figure 11, thereby leaving between the rails 26 an open space O. This is especially desirable to accommodate gun fire when the air craft or airplane is used for military purposes. The construction of the vanes and their operations is the same as in the embodiment of the invention hereinabove described.

While the open centered ceiling is shown as most favorable for military use, it is obvious that a closed ceiling having one or more overhead bearings will be preferable for commercial use, while vanes supported at their ends only would serve for smaller forms of aircraft.

In practice it will probably be desirable to position the top rails 26 between the chains 61 and 71. If desired, the rails 26 may be placed between the chains 61 and 71, the spacing of the parts being varied, as necessary.

I claim:

An air craft including a frame, adjustable vanes mounted on the top of the frame and providing a main sustaining surface to the air craft, means for controlling the position of said vanes, series of vanes arranged on the sides of the frame, certain of said series inclining inwardly, means for controlling the position of the vanes on the sides of the frame, and propelling means for the air craft including a horizontal and a vertical propeller.

WILLIAM CHALMERS.